US012618025B2

(12) United States Patent
Quan

(10) Patent No.: US 12,618,025 B2
(45) Date of Patent: May 5, 2026

(54) CHEMICAL PRODUCT FOR RAPID REMOVAL OF FOOD BURNED ON TO THE SURFACES OF COOKTOPS

(71) Applicant: William Quan, San Francisco, CA (US)

(72) Inventor: William Quan, San Francisco, CA (US)

( * ) Notice: Subject to any disclaimer, the term of this patent is extended or adjusted under 35 U.S.C. 154(b) by 0 days.

(21) Appl. No.: 18/239,448

(22) Filed: Aug. 29, 2023

(65) Prior Publication Data

US 2023/0407212 A1 Dec. 21, 2023

Related U.S. Application Data

(63) Continuation of application No. 17/217,094, filed on Mar. 30, 2021, now abandoned.

(Continued)

(51) Int. Cl.

*C11D 7/08* (2006.01)
*B08B 3/08* (2006.01)

(Continued)

(52) U.S. Cl.

CPC .................. *C11D 7/08* (2013.01); *B08B 3/08* (2013.01); *B08B 3/10* (2013.01); *C11D 3/0057* (2013.01);

(Continued)

(58) Field of Classification Search

CPC .. C11D 3/02; C11D 3/04; C11D 3/042; C11D 3/046; C11D 3/0057; B08B 3/08; B08B 3/10

(Continued)

(56) References Cited

U.S. PATENT DOCUMENTS 6,297,208 B1 10/2001 Crist
2008/0066788 A1* 3/2008 Riou .................... C11D 3/2086 134/42

(Continued)

FOREIGN PATENT DOCUMENTS

EP 3444325 A1 * 2/2019 ............... C11D 1/75
EP 3569682 A1 * 11/2019 ............ C08F 220/34

(Continued)

OTHER PUBLICATIONS

"Handbook of Solvents", George Wypych, Editor, ChemTec Publishing, 2001 on pp. 1227-1228 by Krzsztof M. Benczek and Joanna Kurpiewska.

*Primary Examiner* — Gregory R Delcotto

(57) ABSTRACT

The chemical formulations use chemicals that are use or have been used for other cleaning purposes such as rust stains, but not for glass or glass-ceramic cooktop surfaces. In an embodiment for cleaning glass or glass-ceramic surfaces, percentages of active ingredients, such as either hydrofluoric acid (HF) or ammonium bifluoride (NH4HF2), can be formulated at an about an order lower in concentration by weight than those formulations originally used for removing rust stains (e.g. using the same chemicals for removing rust stains but with a lower concentration for different uses, wherein a different use includes removal of food burned onto cooktops). Additionally, even at the lower concentrations of the active ingredient the physical effort involved and the time for cleaning/removal are much less than with commercially available cleaning products.

5 Claims, 1 Drawing Sheet

Related U.S. Application Data

(60) Provisional application No. 63/101,027, filed on Apr. 14, 2020.

(51) Int. Cl.

| | |
|---|---|
| ***B08B 3/10*** | (2006.01) |
| ***C11D 3/00*** | (2006.01) |
| ***C11D 3/02*** | (2006.01) |
| ***C11D 3/04*** | (2006.01) |
| ***C11D 7/10*** | (2006.01) |
| ***C11D 7/28*** | (2006.01) |

(52) U.S. Cl.
CPC .................. *C11D 3/02* (2013.01); *C11D 3/04* (2013.01); *C11D 3/042* (2013.01); *C11D 3/046* (2013.01); *C11D 7/10* (2013.01); *C11D 2111/14* (2024.01); *C11D 2111/18* (2024.01)

(58) Field of Classification Search
USPC .......... 510/235, 238, 34, 40, 41, 42; 134/34, 134/40, 41, 42
See application file for complete search history.

(56) References Cited

U.S. PATENT DOCUMENTS

| | | | | |
|---|---|---|---|---|
| 2012/0227766 | A1* | 9/2012 | Hafer | C11D 1/825 134/8 |
| 2017/0015945 | A1* | 1/2017 | Larson | C11D 3/0094 |
| 2019/0169550 | A1* | 6/2019 | Hunt, Jr. | C11D 3/225 |

FOREIGN PATENT DOCUMENTS

| | | | | | |
|---|---|---|---|---|---|
| WO | WO-9627654 | A1 * | 9/1996 | | C11D 17/003 |
| WO | WO-2019014470 | A1 * | 1/2019 | | A01N 25/02 |

* cited by examiner

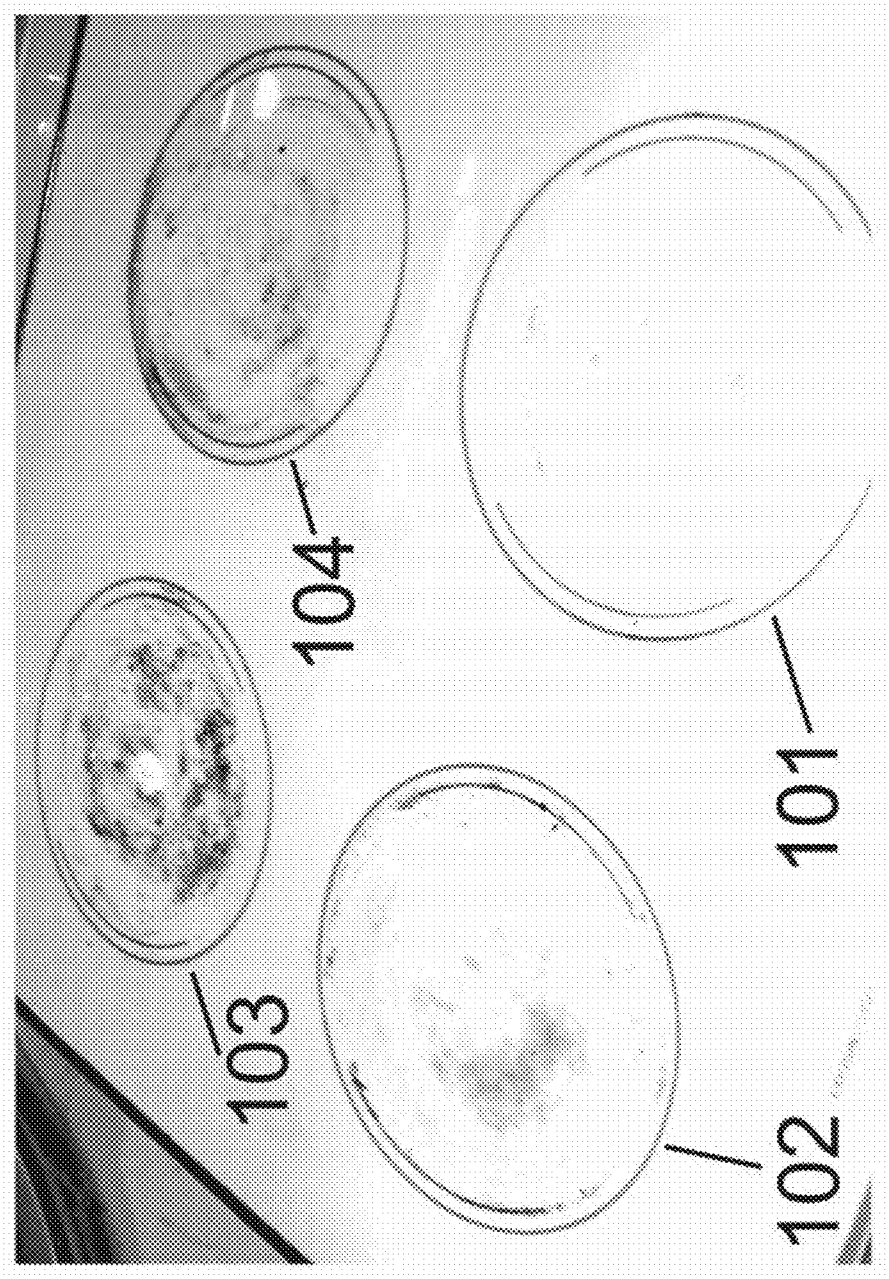
104
103
101
102

CHEMICAL PRODUCT FOR RAPID REMOVAL OF FOOD BURNED ON TO THE SURFACES OF COOKTOPS

This application is a continuation of U.S. application Ser. No. 17/217,094 filed on Mar. 30, 2021, and claims priority to U.S. provisional application Ser. No. 63/101,027 filed on Apr. 14, 2020, which is incorporated herein by reference.

BACKGROUND

There is usually no problem when heated food or even uncooked food gets on a cooktop surface when it is clean up right away. Oftentimes though this is not the typical scenario. Sometimes food, whether it is already burned into the surface or not, is left to be cleaned up for the next day or maybe even some months down the road when the food already burned on to the surface has been repeatedly burned as the cooktop is used for cooking.

Presently, there are a wide variety of products that are recommended for cleaning cooktops. They range from home remedies, such as baking soda and lemon juice to commercial products that range from a single active ingredient, such as isopropyl alcohol, to a mixture of organic chemicals to weak acids like citric acid to something akin to a specially chemically formulated scrub sponge. These products have varying levels of efficacies based on a review of customer comments found on the Internet. One product that seems most effective appears to be the home remedy using baking soda and lemon juice, but it appears to take several applications and is quite labor intensive. The time for removal appears to be in the order of 10 minutes.

Therefore, there exists a need for a reliable product to quickly remove food which had been burned or repeatedly burned over time, such as months, on to the surface of cooktops. The product should be safe to use and price competitive.

The U.S. Pat. No. 6,297,208 rust stain remover by Iron Out, Inc includes a product named Whink, which includes a critical ingredient, fluoroboric acid, produced from a reaction between ammonium bifluoride and boric acid. Other ingredients in the Whink product include oxalic acid, citric acid, a thickener, a surfactant and perfume oil. The thickener is important for the use as a rust stain remover where vertical surfaces such as toilet bowls are involved, but probably not so vital for cooktop surfaces which are typically horizontal. Oxalic acid aids in the removal of rust as it typically complexes with the iron, Fe, of the ferric oxide often found in rust, but may not be necessary as an ingredient for cooktop cleaners.

The U.S. Pat. No. 6,297,208 does not address the removing or cleaning of chemical compounds in food burned or baked on the cooktop surface. U.S. Pat. No. 6,297,208, includes formulations that would etch glass. In terms of concentration, the U.S. Pat. No. 6,297,208 by Crist includes ammonium bifluoride of 3.5% by weight for one of its rust stain remover formulations.

SUMMARY

One or more embodiments relates to removing stains from glass, ceramic, or glass-ceramic surfaces. The glass, ceramic, or glass-ceramic surfaces may be found or used in cooktops. Alternatively, one or more embodiments relates to removing stains from cooktops. Stains may include food particles (or food) burned onto the glass, ceramic, or glass-ceramic surfaces.

One or more embodiments relates to a modification or a (e.g., different or variant) version of a rust stain remover for removal of food that has been burned and re-burned (e.g., perhaps) continually over months onto surfaces (e.g., surfaces of cooktops made of glass, ceramic, or combination of both materials).

In one or more embodiments include a much lower concentration of the use of ammonium bifluoride to remove stains of burnt food. For example, it was found that a lower concentration of ammonium bifluoride (e.g., less than half the 3.5% ammonium bifluoride concentration by weight used in U.S. Pat. No. 6,297,208) was found to be effective in removing food that had been burned on surface(s) of cooktop(s). In one experiment an embodiment including a concentration of about 0.5% (e.g., with plus or minus 30% tolerance range) of ammonium bifluoride by weight was found to be effective in removing food that has been burned on surface(s) of cooktop(s). Another embodiment including even lower concentration levels of ammonium bifluoride such as about 0.05% (e.g., with plus or minus 30% tolerance range) concentration by weight still showed some effectiveness (e.g., 40% to 60% effective) in removing food that has been burned on a surface of a cooktop (e.g., when compared to the concentrations of 0.5% plus or minus 30% tolerance).

Another embodiment may not require including a thickener. Alternatively, an embodiment may not require including a surfactant.

One or more embodiments includes at least one (e.g., novel) formulation for removal of food that has been burned and re-burned perhaps continually over months onto the surfaces of cooktops made of glass, ceramic, or combination of both materials.

At least one embodiment includes a range of formulations for removal of food burned (or baked) onto surfaces of cooktops. For example, cooktops may include glass, ceramic, or a combination of those materials or chemical composition of thereof, such as silicon dioxide in glass. Burnt food may (or may not) include (e.g., but not limited to) acrylamide. Yet another embodiment provides safe application of a chemical compound such that the surfaces of cooktops, including glass, ceramic, or a combination of those materials or chemical composition of thereof, such as silicon dioxide in glass. A safe application of the chemical compound (e.g., or embodiment) includes the lack of etching on one or more kinds of surfaces, wherein the surface (or surfaces) may include glass, ceramic, and/or silicon dioxide. Yet another embodiment avoids the use (or inclusion) of fluoboric acid, which can etch or cause harm to surfaces, such as surfaces including glass, ceramic, and/or silicon dioxide.

Another embodiment may include a formulation including hydrofluoric acid (e.g., HF) or ammonium bifluoride. For example, a formulation including hydrofluoric acid (e.g., HF) and/or ammonium bifluoride provides for removal of food burnt onto surfaces (e.g., cooktops). Hydrofluoric acid may be combined with water (e.g., in an aqueous solution). Ammonium bifluoride may be combined with water (e.g., in an aqueous solution).

An embodiment may include one or more formulations (e.g., for removal of food burnt onto a surface), which includes heating a single chemical. For example, an embodiment may include one or more formulations wherein at least one of the formulations was heated.

Another embodiment may include one or more formulations (e.g., to provide for removal of food burnt onto a surface) that does not require heating of one or more chemicals (e.g., wherein a formulation includes one or more chemicals) For example, an embodiment may include one or more formulations wherein at least one of the formulations (or all the formulations) was not heated.

One or more embodiments or chemical formulations remove(s) stains in 2 minutes or less. The stains may be present in cooktops, glass, ceramic, or glass-ceramic.

Chemical formulations from about 2.5% to about 0.05% HF are effective in rapidly removing, less than two minutes, burned food from cooktop surfaces with 100% efficacy down to approximately 50% at the lower concentrations. The cooktop surfaces could be glass or a combination of glass and ceramic.

Chemical formulations from about 3.0% to about 0.05% ammonium bifluoride, NH4HF2, are effective in rapidly removing, less than two minutes, burned food from cooktop surfaces with (e.g., about) 100% efficacy down to approximately 50% at the lower concentrations. The cooktop surfaces could be glass or a combination of glass and ceramic.

On a by weight basis, based on pH determinations, ammonium bifluoride is more effective than is hydrofluoric acid when used to prepare cleaning formulations.

BRIEF DESCRIPTION OF THE DRAWINGS

FIG. 1 shows an example photo of a cooktop with food burned onto the cooktop.

DETAILED DESCRIPTION

An embodiment includes a range of formulations for removal of food burned onto the surfaces of cooktops. The surfaces may include any combination in composition of the following: glass, ceramic, glass-ceramic, or silicon dioxide (e.g., in glass). One embodiment (e.g., including a range of formulations) is provided by combining about 1% to 10% by weight of ammonium bifluoride and about 1% to 10% boric acid, typically in about equal molarity; the balance which is water with an amount of less than 4% oxalic acid and/or citric acid, and/or small amounts, less than 0.4% of a thickening agent, surfactant, and/or perfume oil.

Yet another embodiment may include at least one of the following (or an embodiment may include any combination of the following): A) Combining about 1% to 10% by weight of ammonium bifluoride and about 1% to 10% boric acid. B) Water. C) Oxalic acid. D) Citric acid. E) Less than or equal to 0.4% of a thickening agent, surfactant, and/or perfume oil.

Another (e.g., effective) formulation would consist of about 3.0% ammonium bifluoride and about 2.5% boric acid. Yet another (e.g., effective) formulation would include approximately 3.5% ammonium bifluoride and about 3.0% boric acid. Yet another effective formulation would include approximately 6% ammonium bifluoride and about 5.5% boric acid. Another effective formulation would include approximately 9% ammonium bifluoride and about 8.5% boric acid. Some other (e.g., effective) formulations would include an addition of approximately 3.0% oxalic acid. For example, adding approximately 3.0% oxalic acid to any of: 1) A formulation consisting of 3.0% ammonium bifluoride and about 2.5% boric acid. 2) A formulation including approximately 3.5% ammonium bifluoride and about 3.0% boric acid. 3) A formulation including approximately 6% ammonium bifluoride and about 5.5% boric acid. 4) A formulation would include approximately 9% ammonium bifluoride and about 8.5% boric acid.) Also, other effective formulations would include an addition of approximately 1% citric acid to the above (or previously mentioned) various formulations. Because of the slight pungent smell of some of the above (or previously mentioned) formulations perfume oil could be added with the aid of a surfactant at approximately 0.1% to 0.3% level. Another formulation (or embodiment) may include other concentrations and percentages.

For all (or any) of the above formulations (or embodiments) initially, to a heated aqueous solution of ammonium bifluoride is added boric acid to form fluoroboric acid all the while maintaining the temperature from the onset of addition. The temperature could range from approximately 40 to 60 degrees Celsius.

For another embodiment, eventually it was found that ammonium bifluoride (e.g., alone) was sufficient. It was found that 3% by weight ammonium fluoride down to even 0.5% provided (e.g., effective) formulations in removing burnt stains in two minutes or less. At about 0.05% by weight of ammonium fluoride, a resulting formulation appeared to be (e.g., only) about 50% effective. In providing or producing an embodiment or formulation, it did not make any difference whether the ammonium fluoride was added to heated water, such as at 45 degree Celsius, or by adding water at room temperature (e.g., with the ammonium fluoride).

Other inorganic salts of bifluoride should work as well, such as potassium bifluoride and sodium bifluoride, which can be substituted for ammonium fluoride in providing a formulation or in providing an embodiment.

A bifluoride anion may dissociate into hydrofluoric acid (HF), a weak acid, which provides for a potent agent for the removal of the burnt food stains on the surface of the cooktop.

It was found that straight hydrofluoric acid, HF, would work as well. About 2.5% concentration by weight HF in water solution provided an effective formulation (e.g., for cleaning surfaces, which may (or may not) include burnt food). Even at about 0.5% HF concentration the formulation was nearly 100% (or substantially) effective. It was found that HF concentrations as low as 0.05% seem to be effective to some extent, perhaps around 50% efficacy. For example, at lower a concentration of HF it was found to be at least partially effective in cleaning surfaces, which may (or may not) include burnt food.

A 3.0% by weight ammonium bifluoride solution had a pH of (e.g., about) 3.93 and a 2.5% hydrofluoric acid solution had a pH of about 2.59. So, the former formulation (e.g., including 3.0% by weight ammonium bifluoride) is more than 10 times weaker than the latter formulation (e.g., including 2.5% hydrofluoric acid), which could not be accounted by the differences in formula weights of the chemical compounds—a difference of 2.5 times not over 10 times.

Different formulations were prepared with a 600 ml beaker (or container) and in quantities of 300 ml using a temperature controlled hot plate/magnetic stirrer system. It is probably best or preferable to use plastic beakers (or plastic containers) as opposed to glass beakers (or glass containers) etc. as HF can etch glass and be consumed in the process. One or more (or each) of the above examples of effective formulations (e.g., preferably) does not cause etching of the cooktop surface. To assess etching a microscope slide and a small sheet of glass-ceramic were separately immersed in the formulations for 10 minutes and then observed to see (or detect) if any etching had occurred. For a more critical evaluation a microscope may also be employed. Also, the formulations' pHs were measured with a pH meter. Formulations that do not etch glass-ceramic and glass were evaluated as a remover of burned on food on the cooktop surface, which in this case was of the glass-ceramic type.

An embodiment (or formulation) with one or two applications of it will removed all food burned into the surface of a cooktop made of glass, ceramic, or a combination thereof in less than five (5) minutes per burner. The number of applications and time of removal will depend on the potency of the formulations.

Attached is a picture (shown in FIG. 1) of efficacy using an embodiment. There are four burners on the cooktop in FIG. 1, which are labeled, 101, 102, 103, and 104. In FIG. 1, the burned on food in this case were oatmeal in water and chicken rice porridge that were repeatedly made over six months. These food types contain amino acids and possibly some sugar; the burnt or black looking material may (or may not) include at least acrylamides. Frequently, the food being prepared boiled over and got burned on the cooktop surface. One of the burners, (burner 101 in FIG. 1) of the cooktop is totally or substantially cleaned. The one next to it, burner 102 in FIG. 1, is partially cleaned using previously discussed products already commercially available and so designated for use. The two blackened burners, shown as 103 and 104 in FIG. 1, are more or less what all the burners looked like at the beginning.

Although one or more of the formulations or embodiments is effective as a rust stain remover where inorganics, such as iron, Fe, is present, one or more of the same formulations (and/or one or more other formulations) is effective in removing burned food, which consist (or include) of organics, from glass-ceramic, glass, ceramic cooktop surfaces.

Another embodiment using active ingredients, such as either hydrofluoric acid (HF) or ammonium bifluoride (NH4HF2), can be formulated at an order of 10 times or more lower than those formulations originally used for removing rust stains (e.g. using substantially the same chemicals for removing rust stains but with a lower concentration for different uses, wherein a different use includes removal of food burned onto cooktops).

One embodiment may include:

a composition for removing food burned onto a surface, comprising:

a chemical formulation including about 3.0% to about 0.05% by weight of ammonium bifluoride (NH4HF2); wherein the composition comprising the chemical formulation including about 3.0% to about 0.5% by weight of ammonium bifluoride (NH4HF2) provides about 100% efficacy for removing food burned only the surface, or wherein the composition comprising the chemical formulation including about 0.05% by weight of ammonium bifluoride (NH4HF2) provides about 50% efficacy for removing burned food onto the surface. For example, the surface may include glass, ceramic, or glass-ceramic, and/or wherein removing the food burned onto the surface is completed in two minutes or less.

An embodiment may include:

A composition for removing food burned onto a surface, comprising:

a chemical formulation including about 2.5% to about 0.05% by weight of hydrofluoric acid (HF); wherein the composition comprising the chemical formulation including about 2.5% to about 0.5% by weight of hydrofluoric acid (HF) provides about 100% efficacy for removing food burned onto the surface, or wherein the composition comprising the chemical formulation including about 0.05% by weight of hydrofluoric acid (HF) provides about 50% efficacy for removing burned food onto the surface. Alternatively, an embodiment may include a composition for removing food burned onto a surface, comprising: a chemical formulation including hydrofluoric acid (HF); wherein the composition comprising hydrofluoric acid (HF) provides efficacy for removing food burned onto the surface. For example, the surface may include glass, ceramic, or glass-ceramic, and/or wherein removing the food burned onto the surface is completed in two minutes or less.

One embodiment may include:

A composition for removing food burned onto a surface, comprising:

a chemical formulation including about 3.0% to about 0.05% by weight of ammonium bifluoride (NH4HF2); wherein the composition comprising the chemical formulation including about 3.0% or about 0.5% by weight of ammonium bifluoride (NH4HF2) provides about 100% efficacy for removing food burned only the surface, or wherein the composition comprising the chemical formulation including about 0.05% by weight of ammonium bifluoride (NH4HF2) provides about 50% efficacy for removing burned food onto the surface. Alternatively, an embodiment may include composition for removing food burned onto a surface, comprising:

a chemical formulation including ammonium bifluoride (NH4HF2);

wherein the composition comprising ammonium bifluoride (NH4HF2) provides efficacy for removing food burned onto the surface. For example, the surface may include glass, ceramic, or glass-ceramic, and/or wherein removing the food burned onto the surface is completed in two minutes or less.

An embodiment may include:

A composition for removing food burned onto a surface, comprising:

a chemical formulation including about 2.5% to about 0.05% by weight of hydrofluoric acid (HF); wherein the composition comprising the chemical formulation including about 2.5% or about 0.5% by weight of hydrofluoric acid (HF) provides about 100% efficacy for removing food burned onto the surface, or wherein the composition comprising the chemical formulation including about 0.05% by weight of hydrofluoric acid (HF) provides about 50% efficacy for removing burned food onto the surface. For example, the surface may include glass, ceramic, or glass-ceramic, and/or wherein removing the food burned onto the surface is completed in two minutes or less.

This disclosure is illustrative and not limiting; further modifications will be apparent to one skilled in the art and are intended to fall within the scope of the appended claims and or of the embodiments described.

That which is claimed is:

1. A method of removing burned acrylamides from a ceramic glass cooktop suface comprising:

providing a cleaning solution of fluoroboric acid;

wherein the fluoroboric acid cleaning solution is formed from a heated aqueous solution of about 3.5% by weight ammonium bifluoride and about 2.5% by weight boric acid;

applying the fluoroboric acid to the ceramic glass cooktop surface having the burned acrylamides, said fluoroboric acid removing the burned acrylamides from the ceramic glass cooktop surface.

2. A method of cleaning a blackened food stain from a ceramic glass cooktop surface comprising:

providing a non-etching formulation for cleaning the blackened food stain from the ceramic glass cooktop surface;

wherein the non-etching formulation consists of water and about 0.5% by weight to about 2.5% by weight of hydrofluoric acid (HF);

applying the non-etching formulation to the blackened food stain on the ceramic glass cooktop surface, and removing the blackened food stain from the ceramic glass cooktop surface.

3. The method of claim 2 wherein the cleaning and removal of the blackened food stain is completed in less than 2 minutes.

4. The method of claim 2 wherein the blackened food stain comprises acrylamides, rice, sugar, porridge, or oatmeal.

5. The method of claim 2 wherein the non-etching formulation having 2.5% by weight of hydrofluoric acid (HF) provides a pH of about 2.59.

* * * * *